United States Patent
Tian et al.

(10) Patent No.: US 10,458,596 B2
(45) Date of Patent: Oct. 29, 2019

(54) HEAD HANDHELD FRAME

(71) Applicant: YUNEEC INTERNATIONAL (CHINA) CO, LTD, Kunshan (CN)

(72) Inventors: Yu Tian, Jiangsu (CN); Wenyan Jiang, Jiangsu (CN)

(73) Assignee: YUNEEC INTERNATIONAL (CHINA) CO, LTD, Kunshan, Jiangsu Province (CN)

( * ) Notice: Subject to any disclaimer, the term of this patent is extended or adjusted under 35 U.S.C. 154(b) by 0 days.

(21) Appl. No.: 15/528,373

(22) PCT Filed: Nov. 26, 2015

(86) PCT No.: PCT/CN2015/095615
§ 371 (c)(1),
(2) Date: May 19, 2017

(87) PCT Pub. No.: WO2016/082770
PCT Pub. Date: Jun. 2, 2016

(65) Prior Publication Data
US 2017/0321843 A1    Nov. 9, 2017

(30) Foreign Application Priority Data
Nov. 28, 2014    (CN) ..................... 2014 2 0735269 U

(51) Int. Cl.
*F16M 13/04*    (2006.01)
*G03B 17/56*    (2006.01)
(Continued)

(52) U.S. Cl.
CPC .......... *F16M 13/04* (2013.01); *F16M 11/041* (2013.01); *F16M 11/10* (2013.01);
(Continued)

(58) Field of Classification Search
CPC ........ F16M 13/04; F16M 11/08; F16M 11/10; F16M 11/041; F16M 11/2071;
(Continued)

(56) References Cited

U.S. PATENT DOCUMENTS 2,796,226 A    6/1957 Dalton et al.
5,863,021 A *  1/1999 Nichols ..................... B25B 7/00
                                                        24/332
(Continued)

FOREIGN PATENT DOCUMENTS

CN        2702340 Y    5/2005
CN      201903734 U    7/2011
(Continued)

*Primary Examiner* — Nkeisha Smith
(74) *Attorney, Agent, or Firm* — Muncy, Geissler, Olds & Lowe, P.C.

(57) ABSTRACT

This invention discloses a pan-tilt hand holder which features that: It includes a clamping mechanism for holding the mobile terminal, a control device, and a power device are provided, wherein, the frame body is configured to install a pan-tilt, the control device is configured to control the movement of the pan-tilt, and the power device is configured to supply electric power to the control device. The application of the invention achieves not only the handheld movement operation of the pan-tilt, but also the operation with just one hand, which is convenient for use.

12 Claims, 3 Drawing Sheets

(51) Int. Cl.
*F16M 11/04* (2006.01)
*F16M 11/10* (2006.01)
*F16M 11/20* (2006.01)
*F16M 13/00* (2006.01)

(52) U.S. Cl.
CPC ........ *F16M 11/2071* (2013.01); *F16M 13/00* (2013.01); *G03B 17/561* (2013.01); *G03B 17/563* (2013.01); *F16M 2200/04* (2013.01); *G03B 2205/0007* (2013.01)

(58) Field of Classification Search
CPC .... F16M 3/00; F16M 2200/04; G02B 17/561; G02B 17/563; H04N 5/2251; G03B 2205/0007
USPC ....................................................... 248/183.3
See application file for complete search history.

(56) References Cited

U.S. PATENT DOCUMENTS

| | | | |
|---|---|---|---|
| 6,184,868 B1* | 2/2001 | Shahoian | A63F 13/06 345/156 |
| 8,727,643 B2* | 5/2014 | Mcleod | F16M 11/041 396/422 |
| 8,845,103 B2* | 9/2014 | Brown | F16M 11/123 348/373 |
| 9,022,673 B2* | 5/2015 | Orton | F16M 11/00 396/425 |
| 9,458,963 B1* | 10/2016 | Choi | F16M 13/022 |
| 9,469,438 B2* | 10/2016 | Nool | B65D 25/22 |
| 9,575,330 B2* | 2/2017 | Wagner | G02B 27/646 |
| 9,746,751 B1* | 8/2017 | Amit | G03B 17/561 |
| 9,781,313 B2* | 10/2017 | Pan | G03B 17/561 |
| 9,798,221 B2* | 10/2017 | Niemeyer | F16M 11/18 |
| 9,816,666 B2* | 11/2017 | Wang | F16M 13/04 |
| 9,851,046 B2* | 12/2017 | Pan | F16M 11/18 |
| 2005/0275624 A1* | 12/2005 | Chadha | G05G 1/025 345/156 |
| 2010/0079101 A1* | 4/2010 | Sidman | F16M 11/041 318/649 |
| 2013/0004153 A1* | 1/2013 | McKee | F16M 11/041 396/420 |
| 2013/0233988 A1* | 9/2013 | Johnson | G03B 17/561 248/229.14 |
| 2015/0071627 A1* | 3/2015 | Hoang | F16M 13/00 396/421 |
| 2015/0076297 A1* | 3/2015 | Parrill | F16M 11/041 248/176.3 |
| 2015/0261070 A1* | 9/2015 | Feng | G03B 17/561 396/421 |
| 2016/0223886 A1* | 8/2016 | Bellerive | G03B 17/561 |
| 2016/0381271 A1* | 12/2016 | Cheng | F16M 11/041 348/208.2 |
| 2017/0064176 A1* | 3/2017 | Kim | F16M 11/18 |
| 2017/0089513 A1* | 3/2017 | Pan | F16M 13/022 |
| 2017/0146892 A1* | 5/2017 | Wei | F16M 11/045 |
| 2017/0159875 A1* | 6/2017 | Wagner | F16M 13/04 |
| 2017/0192341 A1* | 7/2017 | Casarez | G03B 17/561 |
| 2017/0212412 A1* | 7/2017 | Balmer | G03B 17/563 |
| 2017/0227831 A1* | 8/2017 | Tang | G03B 17/561 |
| 2017/0241589 A1* | 8/2017 | Wang | F16M 11/18 |
| 2017/0254469 A1* | 9/2017 | Okamura | F16M 11/126 |
| 2017/0307136 A1* | 10/2017 | Wei | G03B 17/561 |
| 2017/0307972 A1* | 10/2017 | Okumura | H04N 5/2251 |
| 2017/0359943 A1* | 12/2017 | Calleija | A01B 79/005 |
| 2017/0370522 A1* | 12/2017 | Schield | F16M 13/04 |

FOREIGN PATENT DOCUMENTS

| | | |
|---|---|---|
| CN | 203147191 U | 8/2013 |
| CN | 203384588 U | 1/2014 |
| CN | 203574781 U | 4/2014 |
| CN | 203950109 U | 11/2014 |

\* cited by examiner

HEAD HANDHELD FRAME

This application claims the priority of the Chinese patent application CN201420735269.X filed on Nov. 28, 2014, which is incorporated herein by reference.

FIELD OF THE INVENTION

The invention relates to the Pan-tilt Hand Holder.

BRIEF DISCUSSION OF THE RELATED ART

The video recording or shooting angle of existing photograph equipment is difficult to adjust, while the pan-tilt is able to rotate at any angle, so as to achieve no-dead-shooting result. However, the rotation of the pan-tilt is achieved by the internal motor, so the control system is needed herein to control it; and pan-tilt itself is not provided with any display equipment, so the image captured cannot be seen immediately. Therefore, the pan-tilt mostly acts as a fixed photographing equipment, and cannot incorporate the advantages such as multi-angle photographing etc. into the handheld photographing.

SUMMARY OF THE INVENTION

The technical problem to be solved by the invention is to overcome the drawbacks that the handheld photographing cannot be incorporated into pan-tilt of the current technology, and to provide a pan-tilt hand holder.

The invention uses the following technical scheme to solve the above-mentioned technical problems:

A pan-tilt hand holder, comprising: a frame body, in which a clamping mechanism for holding the mobile terminal, a control device, and a power device are provided, wherein, the frame body is configured to install a pan-tilt, the control device is configured to control the movement of the pan-tilt, the power device is configured to supply electric power for the control device.

Mobile terminals such as mobile phones etc. are provided with a WIFI transmission equipment. In the current art, many pan-tilts also have WIFI transmission equipment, which enables the acquirement of the images shot with pan-tilt through mobile terminals such as mobile phones etc. When using the invention, the operators just need to hold the pan-tilt hand holder to operate the control device with just one hand, so as to achieve the photographing angle control of pan-tilt, at this time, there is no need to rotate the hand holder. And at the same time while operating, the captured images can be viewed through a mobile phone clapped on the pan-tilt hand holder. The whole operation can be achieved just with one hand, which is quite simple. And the power device fully ensures electricity power of pan-tilt and control device. Thus, the invention achieves not only the handheld movement operation of the pan-tilt, but also the operation with just one hand, which is convenient for use.

Preferably, the control device includes a potentiometer roller, a roller panel and a main control circuit board, wherein, the roller panel is installed on the frame body;

the main control circuit board is configured to control the movement of the pan-tilt, and the main control circuit board is connected with the potentiometer roller.

When photographing, the potentiometer roller is operated, and the main control circuit board will receive the operation signal, then it will control the pan-tilt to rotate. The potentiometer roller stated here includes but not just limited to the form of roller, it could be various components which can transfer operation signals such as the rocker etc., all of these fall within the protection scope of the invention.

Preferably, the main control circuit board is installed inside the frame stated through a fixed support. The fixed support can fix the main control circuit board much more firmly.

Preferably, the clamping mechanism includes a torsion spring seat, a torsion spring shaft, a torsion spring and a rotary gripper, wherein:

the torsion spring seat is fixed on the frame body;

the torsion spring shaft is installed through the torsion spring, the torsion spring seat and the rotary gripper;

the two ends of the torsion spring are respectively installed closely on the torsion spring seat and the rotary gripper.

When operating, the mobile phone can be put inside the rotary gripper by pulling it open, and then, under the elastic force of the torsion spring, the rotary gripper is rotated to clamp the mobile phone so as to ensure that the mobile phone will not slip down.

Preferably, the rotary gripper includes: a clapping part and an operating part. In case the rotary gripper is needed to pull open, pressing the operating part with one finger is enough, which is convenient to operate.

Preferably, a foam is provided above the operating part. The foam can strengthen the handfeel of the fingers while touching it.

Preferably, the power device includes a power supply box and a box cover. Inside the power supply box, the batteries can be placed, and whenever the batteries are needed to replace, just open the box cover to replace them.

Preferably, the power supply device further includes a power switch and a switch button. The power switch can be triggered by operating the switch button, so as to operate to perform the open or close of the circuit.

Preferably, the frame body includes a platform part, and the clamping mechanism is installed on the upper surface of the platform part, and the pan-tilt is installed on the bottom surface of the platform part. Thus, the space of the frame can be fully configured to realize the miniaturization of the pan-tilt hand holder.

Preferably, the frame body includes a gripping part, on which the rubber handguard is provided. The rubber handguard can increase the friction to avoid slipping.

Preferably, the frame body includes a seat part, which is provided at the lower end of the gripping part. When the seat part is not needed or the photographing shall be fixed, the pan-tilt hand holder can be put on the platform such as desktop etc. through the seat part.

Preferably, the frame body includes a left frame body and a right frame body. Through this arrangement, the wires, the main control circuit board and the power supply box etc. can be arranged inside the frame.

In this invention, the preferred conditions stated above can be combined randomly on the basis that they meet the common sense of this field, that's to say, the various kinds of preferred embodiments of this invention can be realized.

The positive effect of this invention lies in that: through the use of the invention, it achieves not only the handheld movement operation of the pan-tilt, but also the operation with just one hand, which is convenient for use.

DESCRIPTION OF SIGNS IN THE FIGURES

Figure 1:
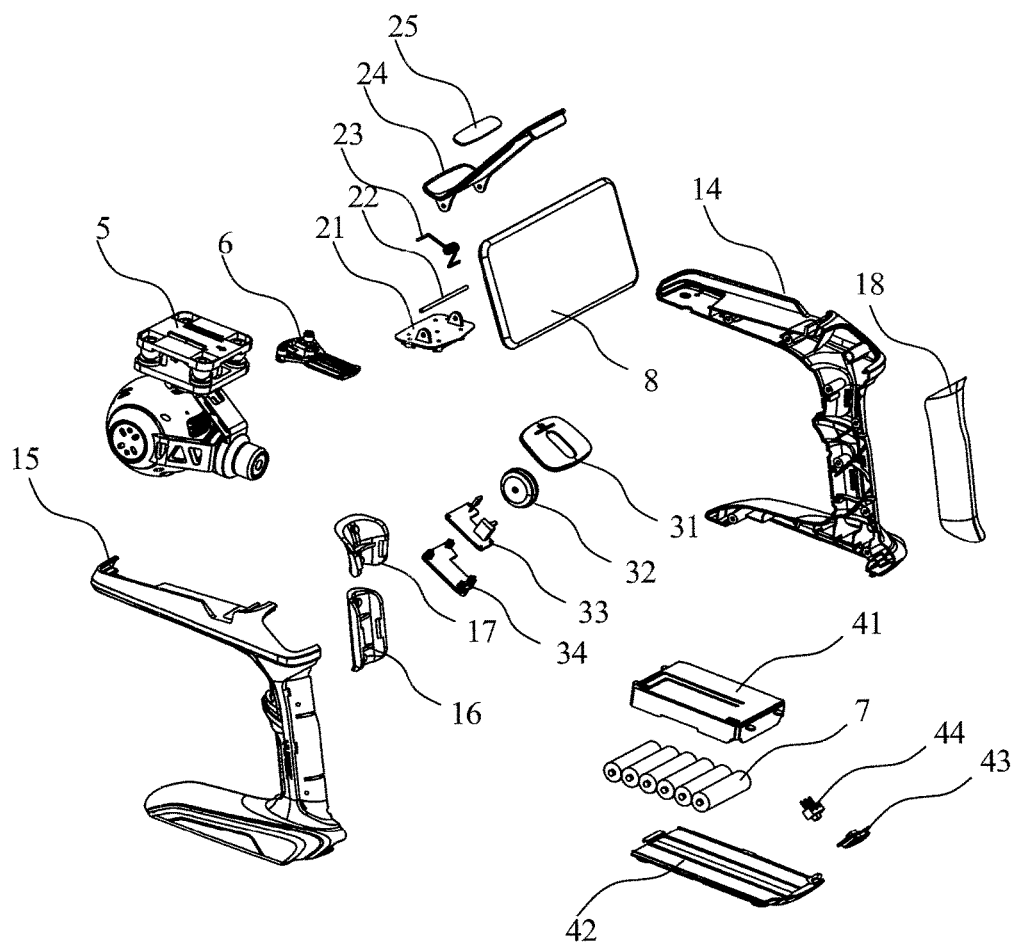
FIG. 1 is an explosion diagram of the pan-tilt hand holder in a preferred embodiment of this invention.

Frame body 1
Platform part 11
Gripping part 12
Seat part 13
Right frame body 14
Right frame body 15
Rubber handguard 16
Rubber handguard 17
Rubber handguard 18
Torsion spring seat 21
Torsion spring shaft 22
Torsion spring 23
Rotary gripper 24
Operating part 241
Clapping part 242
Foam 25
Roller panel 31
Potentiometer roller 32
Main control circuit board 33
Fixed foothold 34
Power supply box 41
Box cover 42
Switch button 43
Power switch 44
Pan-tilt 5
Pan-tilt fixed frame 6
Battery
Mobile phone

DETAILED DISCUSSION OF THE PREFERRED EMBODIMENTS

Now, a much clear and complete instruction will be given below to this invention with a preferred embodiment of this invention combining the attached figures.

Figure 3:
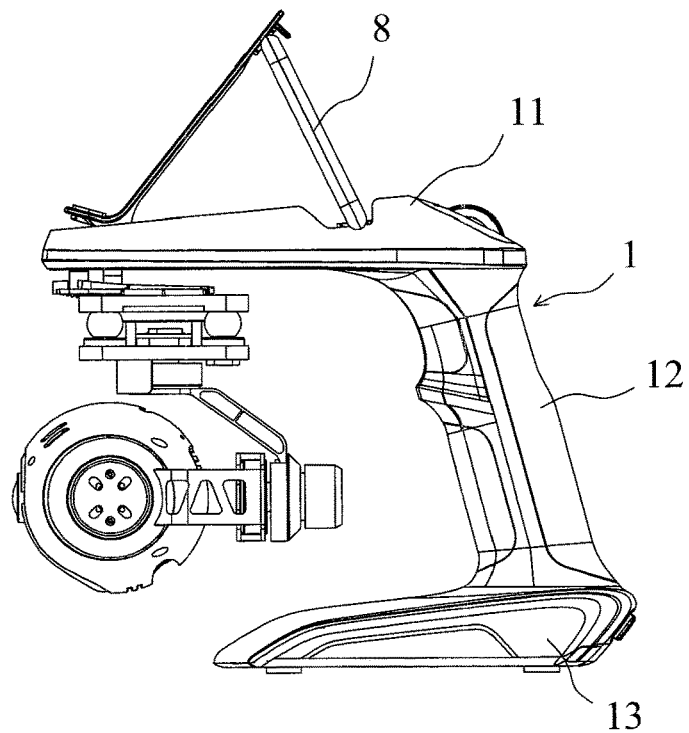
FIG. 3 is a front view diagram of the pan-tilt hand holder in a preferred embodiment of this invention.

This invention discloses a pan-tilt hand holder. As shown by FIG. 1 and FIG. 3, the pan-tilt hand holder includes a frame body 1. The frame body 1 is combined with a left frame body 15 and a right frame body 14. The inside of the frame body 1 combined by the left frame body 15 and the right frame body 14 is hollow structure, in where the wires, the main control circuit board 33 and the power supply box 41 etc. can be arranged.

Figure 4:
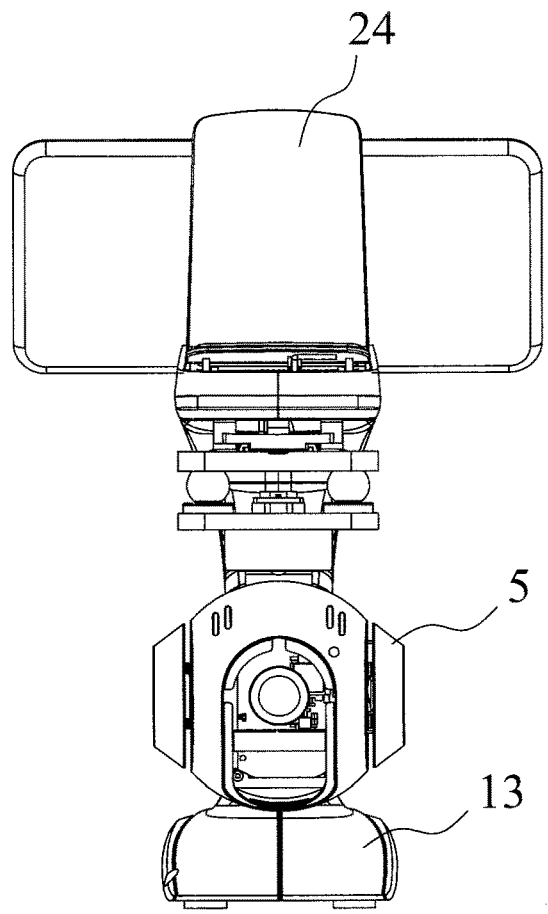
FIG. 4 is a side schematic diagram of the pan-tilt hand holder in a preferred embodiment of this invention.

As shown by FIG. 3 and FIG. 4, the combined frame body 1 includes a platform part 11, a gripping part 12, and a seat part 13, wherein, a clamping mechanism is installed on the upper surface of the platform part 11, and a pan-tilt 5 is installed on the bottom surface of the platform 11. Thus, the space of the frame body 1 can be fully configured to realize the miniaturization of the pan-tilt hand holder. In this embodiment, the pan-tilt 5 is connected to the platform part 11 through a pan-tilt fixed frame 6.

The gripping part 12 is used for gripping operation, and the rubber handguard 16 and rubber handguard 17 are provided in the front end of the gripping part 12, and the rubber handguard 18 is provided in the rear end of the gripping part 12. The rubber handguard can increase the friction to avoid slipping.

The seat part 13 is installed at the lower end of the gripping part 12. When the seat part is not needed or the photographing shall be fixed, the pan-tilt hand holder can be installed on the platform such as desktop etc. through the seat part 13.

Figure 2:
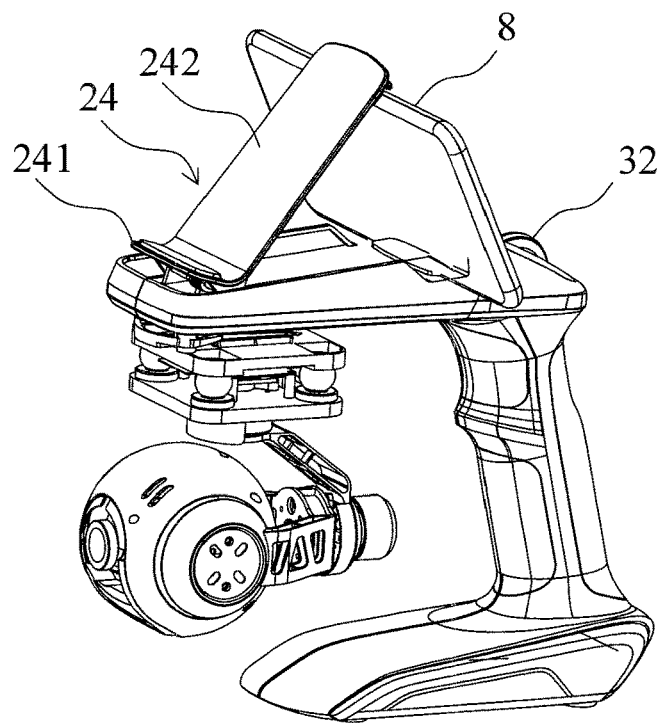
FIG. 2 is a schematic diagram of the pan-tilt hand holder in a preferred embodiment of this invention.

As shown by FIG. 1 and FIG. 2, the clamping mechanism includes a torsion spring seat 21, a torsion spring shaft 22, a torsion spring 23 and a rotary gripper 24.

The torsion spring seat 21 is fixed on the platform part 11 of the frame body 1, the two sides of the torsion spring seat are set with perforations. The two sides of the rotary gripper 24 are also set with perforations. Thus, the torsion spring shaft 22 passes through the torsion spring 23, the torsion spring seat 21 and the rotary gripper 24. At this time, the two ends of the torsion spring are respectively installed closely on the torsion spring seat 21 and the rotary gripper 24 to provide elasticity.

When operating, the mobile phone 8 can be put inside the rotary gripper 24 by pulling it open, and then, under the elastic of the torsion spring 23, the rotary gripper 24 is rotated to clamp the mobile phone 8 so as to ensure that the mobile phones 8 will not slip down.

Preferably, the rotary gripper 24 includes: a clamping part 242 and an operating part 241. In case the rotary gripper 24 is needed to pull open, pressing the operating part 241 with one finger is enough, which is convenient to operate.

Preferably, a foam 25 is provided on the operating part 241. The foam 25 can strengthen the handfeel of the fingers while touching it.

Figure 5:
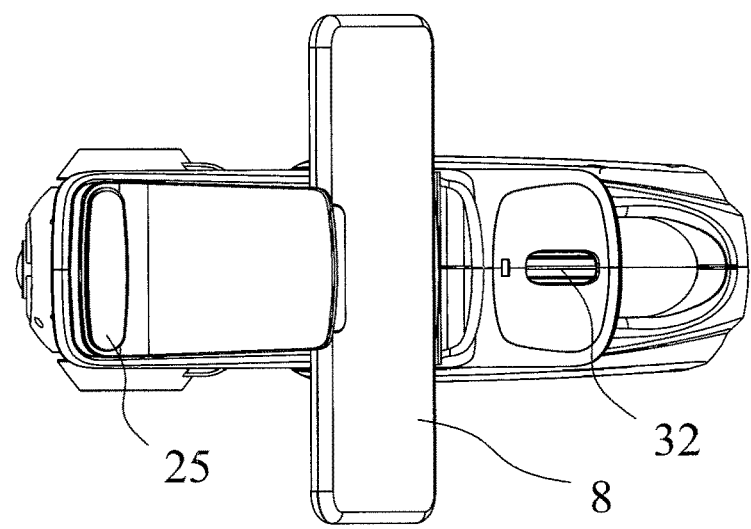
FIG. 5 is a top view diagram of the pan-tilt hand holder in a preferred embodiment of this invention.

As shown in FIG. 1 and FIG. 5, the pan-tilt hand holder of the invention further incorporates the potentiometer roller 32, the roller panel 31 and the main control circuit board 33, wherein, the roller panel 31 is installed on the frame body 1 stated, and the roller panel 31 is set with penetration, while part of the potentiometer roller 32 is outside the penetration.

The main control circuit board 33 is configured to control the movement of the pan-tilt 5, and the main control circuit board 33 is connected electrically with the pan-tilt through the control wires buried inside the frame body 1.

The potentiometer roller 32 is connected with the main control circuit board 33. When the potentiometer roller 32 rotates, the main control circuit board will receive the rotation signal.

When photographing, after the potentiometer roller 32 is operated, the main control circuit board 33 will receive the operation signal, then it will control the pan-tilt 5 to rotate. In this embodiment, the potentiometer roller 32 mainly achieves the single axle rotation of the pan-tilt, such as rotation of pitching.

The potentiometer roller 32 here includes but not just limited to the form of roller, it could be various components such as the rocker etc., so as to achieve the two axles' rotation. Three rollers could also be set to correspond with three axles respectively.

Furthermore, the main control circuit board 33 is installed inside the frame body 1 through a fixed support 34. The fixed support 34 can fix the main control circuit board 33 much more firmly.

As shown in FIG. 1, this embodiment further includes a power supply box 41 and a box cover 42. The box cover 42 is provided at the open place of the power supply box 41. Inside the power supply box, the batteries 7 can be placed, and whenever the batteries are needed to replace, just open the box cover 42 to replace them. Through the batteries 7, power could be supplied to the main control circuit board 33 and the pan-tilt 5. Of course, it also can be set with equipment such as the chargeable Li batteries. Preferably, a USB charge port can also be set.

The power switch 44 and the switch button 43 are also provided on frame body 1. The switch button 43 and the power switch are ganged connection. The power switch 44 is triggered by operating the switch button 43, so as to operate to perform the open or close of the circuit.

The mobile terminals such as mobile phones 8 etc. are provided with a WIFI transmission equipment. In the current art, many pan-tilts also have WIFI transmission equipment, which enables the acquirement of the images shot with pan-tilt through the mobile terminal 8 such as mobile phones etc. When using the invention, the operators just need to hold the pan-tilt hand holder to operate potentiometer roller 32 with just one hand, so as to achieve the photographing angle control of the pan-tilt 5, at this time, there is no need to rotate the hand holder. And at the same time while operating, the captured image can be viewed through a mobile phone 8 clapped on the pan-tilt hand holder. The whole operation can be achieved just with one hand, which is quite simple. And the power device fully ensures electricity power of pan-tilt and control device. Thus, the invention achieves not only the hand holder movement operation of the pan-tilt 5, but also the operation with just one hand, which is convenient for use.

While the specific embodiments of the invention have been described above, it shall be understood by those technicians skilled in this art that these are merely illustrative instruction, and that various changes or modifications may be made to these embodiments under the premise of not departing from the principle and spirit of the invention. Therefore, the scope of the invention is defined by the appended claims.

The invention claimed is:

1. A pan-tilt hand holder, comprising:
   a frame body, in which a control device and a power device are provided; and
   a clamping mechanism, configured to hold a mobile terminal, disposed on a top surface of the frame body,
   wherein the frame body is configured to install a pan-tilt image capture device on a bottom surface of the frame body,
   wherein the control device is configured to control the movement of the pan-tilt image capture device,
   wherein the power device is configured to supply electric power for the control device,
   wherein the control device comprises a potentiometer roller, a roller panel and a main control circuit board,
   wherein the roller panel is installed on the frame body, and
   wherein the main control circuit board is configured to control the movement of the pan-tilt image capture device, and the main control circuit board is connected with the potentiometer roller.

2. The pan-tilt hand holder of claim 1, wherein the main control circuit board is installed inside the frame body through a fixed support.

3. The pan-tilt hand holder of claim 1, wherein the clamping mechanism comprises a torsion spring seat, a torsion spring shaft, a torsion spring and a rotary gripper,
   wherein the torsion spring seat is fixed on the frame body,
   wherein the torsion spring shaft is installed through the torsion spring, the torsion spring seat and the rotary gripper, and
   wherein two ends of the torsion spring are respectively installed closely on the torsion spring seat and the rotary gripper.

4. The pan-tilt hand holder of claim 3, wherein the rotary gripper comprises a clapping part and an operating part.

5. The pan-tilt hand holder of claim 4, wherein a foam is provided above the operating part.

6. The pan-tilt hand holder of claim 1, wherein the power device comprises a power supply box and a box cover.

7. The pan-tilt hand holder of claim 6, wherein the power supply device further comprises a power switch and a switch button.

8. A pan-tilt hand holder, comprising:
   a frame body, in which a control device and a power device are provided; and
   a clamping mechanism, configured to hold a mobile terminal, disposed on a top surface of the frame body,
   wherein the frame body is configured to install a pan-tilt image capture device on a bottom surface of the frame body,
   wherein the control device is configured to control the movement of the pan-tilt image capture device,
   wherein the power device is configured to supply electric power for the control device, and
   wherein the frame body comprises a platform part, the clamping mechanism is installed on an upper surface of the platform part, and the pan-tilt image capture device is installed on a bottom surface of the platform part.

9. The pan-tilt hand holder of claim 1, wherein the frame body comprises a gripping part, on which a rubber handguard is provided.

10. The pan-tilt hand holder of claim 9, wherein the frame body comprises a seat part, which is provided at the lower end of the gripping part.

11. The pan-tilt hand holder of claim 1, wherein the frame body comprises a left frame body and a right frame body.

12. The pan-tilt hand holder of claim 1, wherein an image captured by the pan-tilt image capture device is viewable on the mobile terminal.

* * * * *